United States Patent
Adwait (10) Patent No.: US 10,417,268 B2
(45) Date of Patent: Sep. 17, 2019

(54) KEYPHRASE EXTRACTION SYSTEM AND METHOD

(71) Applicant: Druva Technologies PTE. LTD., Singapore (SG)

(72) Inventor: Bhave Adwait, Pune (IN)

(73) Assignee: Druva Technologies PTE. LTD., Singapore (SG)

( * ) Notice: Subject to any disclaimer, the term of this patent is extended or adjusted under 35 U.S.C. 154(b) by 0 days.

(21) Appl. No.: 15/832,892

(22) Filed: Dec. 6, 2017

(65) Prior Publication Data

US 2019/0095526 A1 Mar. 28, 2019

(30) Foreign Application Priority Data

Sep. 22, 2017 (IN) .............................. 201741033719

(51) Int. Cl.
*G06F 17/27* (2006.01)
*G06F 16/33* (2019.01)
*G06F 16/34* (2019.01)

(52) U.S. Cl.
CPC ........ *G06F 16/3344* (2019.01); *G06F 16/345* (2019.01); *G06F 17/2755* (2013.01); *G06F 17/2775* (2013.01); *G06F 17/2785* (2013.01)

(58) Field of Classification Search
CPC ............. G06F 17/2705; G06F 17/2775; G06F 17/2785; G06F 17/30613; G06F 17/30616

(Continued)

(56) References Cited

U.S. PATENT DOCUMENTS 6,167,368 A * 12/2000 Wacholder ............ G06F 17/271
704/9
6,549,897 B1 * 4/2003 Katariya ........... G06F 17/30616

(Continued)

OTHER PUBLICATIONS

Barker, Ken, et al . "Using noun phrase heads to extract document keyphrases." Conference of the Canadian Society for Computational Studies of Intelligence. Springer, Berlin, Heidelberg, May 2000, pp. 40-52. (Year: 2000).*

(Continued)

*Primary Examiner* — James S Wozniak
(74) *Attorney, Agent, or Firm* — Harness, Dickey & Pierce, P.L.C.

(57) ABSTRACT

A keyphrase extraction system and method is provided. The keyphrase extraction system includes a memory having computer-readable instructions stored therein. The keyphrase extraction system also includes a processor configured to access a document. The processor is configured to identify a plurality of candidate phrases from the document based upon a part-of-speech tag pattern. Each of the plurality of candidate phrases comprises one or more candidate terms. In addition, the processor is further configured to access an external knowledge base to determine a vocabulary frequency count of the one or more candidate terms. The vocabulary frequency count of the one or more candidate terms corresponds to a count of appearance of the respective candidate term in a plurality of documents accessible by the external knowledge base. Further, the processor is configured to estimate a phrase score for each of the plurality of candidate phrases based upon the vocabulary frequency count of the one or more candidate terms of each of the plurality of candidate phrases. Furthermore, the processor is configured to filter the plurality of candidate phrases based upon the estimated phrase score and pre-determined thresh- (Continued)

olds to determine one or more key phrases present in the document.

19 Claims, 7 Drawing Sheets

(58) Field of Classification Search
USPC ............................... 704/9–10; 707/741, 750
See application file for complete search history.

(56) References Cited

U.S. PATENT DOCUMENTS

| | | | | |
|---|---|---|---|---|
| 7,461,056 | B2* | 12/2008 | Cao | G06F 17/2775 |
| 8,589,399 | B1* | 11/2013 | Lee | G06F 17/30616 |
| | | | | 707/737 |
| 9,201,927 | B1* | 12/2015 | Zhang | G06F 17/271 |
| 2007/0067289 | A1* | 3/2007 | Novak | G06F 17/2775 |
| 2007/0078889 | A1* | 4/2007 | Hoskinson | G06F 17/30705 |
| 2007/0112764 | A1* | 5/2007 | Yih | G06F 17/241 |
| 2007/0266020 | A1* | 11/2007 | Case | G06F 17/3071 |
| 2008/0120092 | A1* | 5/2008 | Moore | G06F 17/2827 |
| | | | | 704/4 |
| 2008/0189074 | A1* | 8/2008 | Lin | G06F 17/30719 |
| | | | | 702/181 |
| 2009/0112828 | A1* | 4/2009 | Rozenblatt | G06F 17/30672 |
| 2009/0265338 | A1* | 10/2009 | Kraft | G06F 17/30864 |
| 2011/0078167 | A1* | 3/2011 | Sundaresan | G06F 17/2785 |
| | | | | 707/765 |
| 2011/0078585 | A1* | 3/2011 | King | G06F 17/30011 |
| | | | | 715/751 |
| 2011/0191098 | A1* | 8/2011 | Thomas | G06F 17/27 |
| | | | | 704/9 |
| 2012/0117092 | A1* | 5/2012 | Stankiewicz | G06F 17/30654 |
| | | | | 707/755 |
| 2012/0143860 | A1* | 6/2012 | Gherman | G06F 17/2715 |
| | | | | 707/727 |
| 2016/0055376 | A1* | 2/2016 | Koduru | G06K 9/00449 |
| | | | | 382/176 |
| 2016/0179787 | A1* | 6/2016 | Deleeuw | G06F 17/2785 |
| | | | | 704/9 |
| 2017/0124174 | A1* | 5/2017 | Starr | G06F 17/30598 |
| 2017/0140219 | A1* | 5/2017 | King | G06K 9/00483 |
| 2018/0005300 | A1* | 1/2018 | Hamada | G06F 17/30011 |
| 2018/0096203 | A1* | 4/2018 | King | G06F 17/214 |

OTHER PUBLICATIONS

Chen, Mo, et al. "A practical system of keyphrase extraction for web pages." Proceedings of the 14th ACM international conference on Information and knowledge management. ACM, Oct. 2005, pp. 277-278. (Year: 2005).*

Li, Juanzi, et al. "Keyword extraction based on tf/idf for Chinese news document." Wuhan University Journal of Natural Sciences 12.5, Sep. 2007, pp. 917-921. (Year: 2007).*

Kalaycilar, et al. "Turkeyx: Turkish keyphrase extractor." 2008 23rd International Symposium on Computer and Information Sciences, ISCIS 2008. Oct. 2008, pp. 1-4. (Year: 2008).*

Kim, et al. "Evaluating N-gram based evaluation metrics for automatic keyphrase extraction." Proceedings of the 23rd international conference on computational linguistics. Association for Computational Linguistics, Aug. 2010, pp. 572-580. (Year: 2010).*

Puniru, Janardhana, et al. "Automatic acquisition of concepts from domain texts." Granular Computing, 2006 IEEE International Conference on. IEEE, May 2006, pp. 424-427. (Year: 2006).*

Sheremetyeva. "On extracting multiword NP terminology for MT." EAMT-2009: Proceedings of the 13th Annual Conference of the European Association for Machine Translation/ed. Lluís Màrquez and Harold Somers (May 14-15, 2009).—Barcelona, Spain: Universitat Politècnica de Catalunya. May 2009, pp. 205-212. (Year: 2009).*

Witten, Ian H., et al. "KEA: Practical Automated Keyphrase Extraction." Design and Usability of Digital Libraries: Case Studies in the Asia Pacific. IGI Global, 2005. 129-152. (Year: 2005).*

Wong, Wilson, et al. "A probabilistic framework for automatic term recognition." Intelligent Data Analysis 13.4, Jan. 2009, pp. 499-539. (Year: 2009).*

Hammouda, Khaled, et al. "Distributed collaborative web document clustering using cluster keyphrase summaries." Information Fusion 9.4, Oct. 2008, pp. 465-480. (Year: 2008).*

* cited by examiner

It is important to recognize that the structural levels of organization described herein are a unique characteristic of the brain. They are nowhere to be found in a digital computer, and we are nowhere close to re-creating them with artificial neural networks. Nevertheless, we are inching our way toward a hierarchy of computational levels similar to that of simple models of brain. The artificial neurons we use to build our neural networks are truly primitive in comparison with those found in the brain. The neural networks we are presently able to design are just as primitive compared with the local circuits and the interregional circuits in the brain. What is really satisfying, however, is the remarkable progress that we have made on so many fronts. With neurobiological tools that we are bringing together, it is certain that our understanding of artificial neural networks and their applications will continue to grow in depth as well as breadth, year after year.

| Grouped Truth Judgments | Microsoft Alignment Agent | Cognitive | Features? | Reasoning Rate | NLP Pattern Match | | Features | Team Extraction | Key Phrase Extraction System |
|---|---|---|---|---|---|---|---|---|---|
| Level 1 Keyphrase | 4 | 4 | 2 | 3.5 | 0 | 3 | 4 | 1 | 3-4 |
| Acceptable but not level 1 | | 2 | 3 | 1 | 0 | 4 | 3 | 1 | 3 |
| Over generation | | 13 | 14 | 6 | 4 | 38 | 21 | 7 | 0 | 5 |

KEYPHRASE EXTRACTION SYSTEM AND METHOD

PRIORITY STATEMENT

The present application hereby claims priority under 35 U.S.C. § 119 to Indian patent application number 201741033719 filed 22 Sep. 2017, the entire contents of which are hereby incorporated herein by reference.

FIELD

Embodiments of the invention relate generally to a keyphrase extraction system, and more particularly to a system and method for extracting quality key phrases present in documents.

BACKGROUND

Numerous sources of information are readily available to individuals. Typically, documents are rich with information and it could be tedious for individuals to go through lengthy documents to extract the information of interest to them. An individual can go through a document and identify salient points of the document that can be represented as key phrases. However, manual identification of the key phrases can be subjective and time consuming as well.

Various information retrieval techniques have been used to identify key phrases in documents. For example, some systems utilize external knowledge in form of sources such as Wikipedia, web crawls, concept databases etc. to search and extract key phrases for a document. However, using such resources can be expensive and time consuming. Certain systems use simple data sources such as word lists and concept dictionaries. However, such data sources can be limiting as they contain relatively less information and usage of such sources may result in poor quality key phrase extraction.

Some systems use deep learning techniques for key phrase extraction from documents. However, such techniques require substantially large amounts of pre-labelled datasets that are difficult to create because of multiple resource constraints and subjective nature of the tasks involved.

SUMMARY

The following summary is illustrative only and is not intended to be in any way limiting. In addition to the illustrative aspects, example embodiments, and features described above, further aspects, example embodiments, and features will become apparent by reference to the drawings and the following detailed description.

Example embodiments provide an adaptive analytics framework and method to enable solutions to multiple business problems in varied classes.

Briefly, according to an example embodiment, a keyphrase extraction system is provided. The keyphrase extraction system includes a memory having computer-readable instructions stored therein. The keyphrase extraction system also includes a processor configured to access a document. The processor is configured to identify a plurality of candidate phrases from the document based upon a part-of-speech tag pattern. Each of the plurality of candidate phrases comprises one or more candidate terms. In addition, the processor is further configured to access an external knowledge base to determine a vocabulary frequency count of the one or more candidate terms. The vocabulary frequency count of the one or more candidate terms corresponds to a count of appearance of the respective candidate term in a plurality of documents accessible by the external knowledge base. Further, the processor is configured to estimate a phrase score for each of the plurality of candidate phrases based upon the vocabulary frequency count of the one or more candidate terms of each of the plurality of candidate phrases. Furthermore, the processor is configured to filter the plurality of candidate phrases based upon the estimated phrase score and pre-determined thresholds to determine one or more key phrases present in the document.

According to another example embodiment, a method for extracting key phrases present in a document is provided. The method involves identifying a plurality of candidate phrases from the document based upon a part-of-speech tag pattern, wherein each of the plurality of candidate phrases comprises one or more candidate terms. The method involves determining a vocabulary frequency count of the one or more candidate terms of each of the plurality of candidate phrases using an external knowledge base. In addition, the method involves estimating a phrase score for each of the plurality of candidate phrases based on the vocabulary frequency count of the one or more candidate terms of the respective candidate phrases. Further, the method involves determining one or more key phrases present in the document based on the estimated phrase score of each of the plurality of candidate phrases.

According to yet another example embodiment, a keyphrase extraction system is provided. The keyphrase extraction system includes a memory having computer-readable instructions stored therein. The keyphrase extraction system also includes a processor configured to extract one or more key phrases present in a document. The processor includes a candidate phrase extractor configured to identify a plurality of candidate phrases from the document using a noun phrase extraction technique. Each of the plurality of candidate phrases comprises one or more candidate terms. The processor further includes a word count determination module configured to access an external knowledge base to determine a word count of the one or more candidate terms. The word count of the one or more candidate terms corresponds to a count of appearance of the respective candidate term in a plurality of documents accessible by the external knowledge base. In addition, the processor includes a key phrase selection module configured to estimate a phrase score for each of the plurality of candidate phrases based upon the word count of the one or more candidate terms of each of the plurality of candidate phrases and to determine one or more key phrases based upon the estimated phrase score.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to a keyphrase extraction system and method for extracting quality key phrases from documents. Example embodiments of the present technique provide a keyphrase extraction system that utilizes a combination of speech tagging and word frequency count to extract one or more key phrases of the documents.

Figure 1:
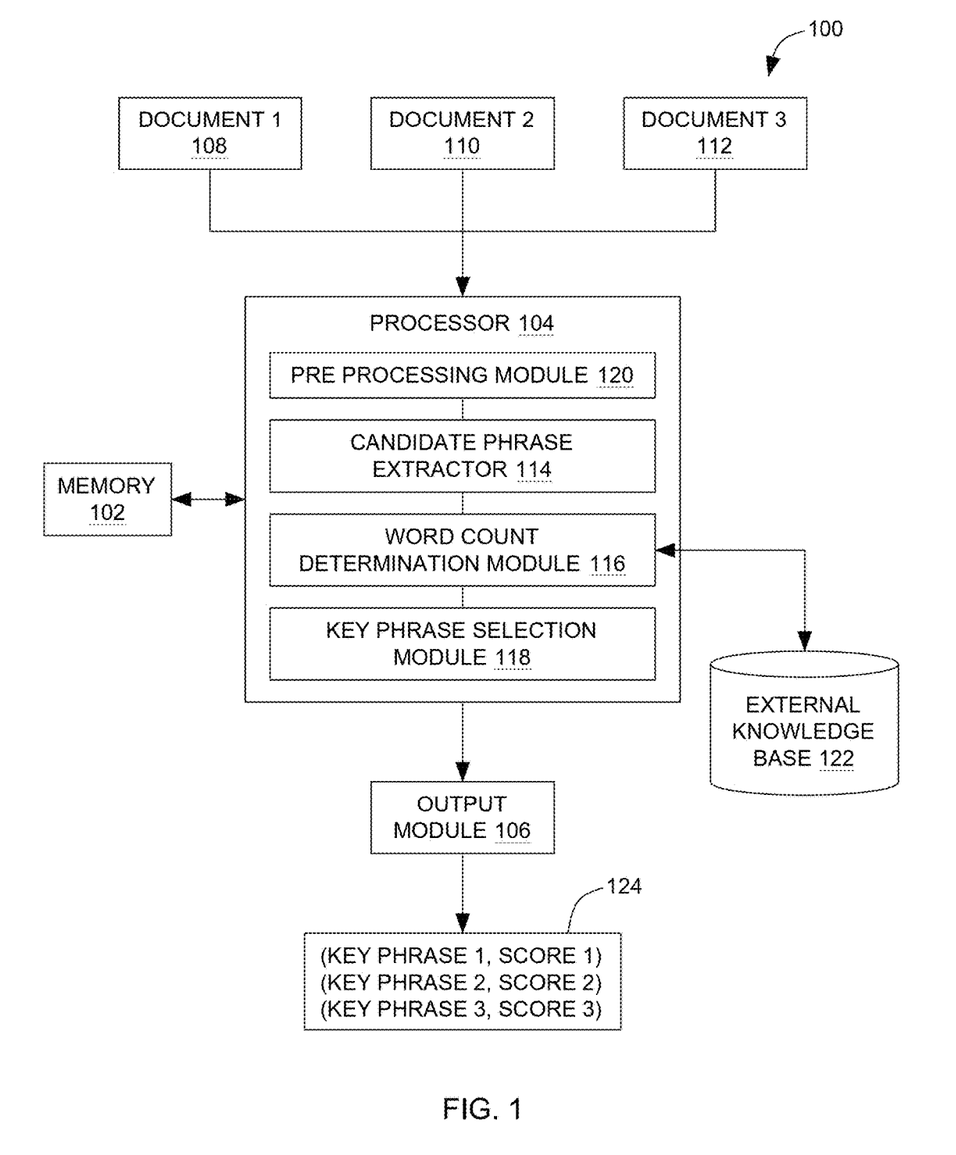
FIG. 1 is an example representation of a keyphrase extraction system, according to an example embodiment.

FIG. 1 is an example representation of a keyphrase extraction system 100, according to an example embodiment. The keyphrase extraction system 100 includes a memory 102, a processor 104 and, an output module 106. The processor 104 is configured to extract one or more key phrases present in a document such as represented by reference numerals 108, 110 and 112. The documents such as represented by reference numerals 108, 110 and 112 may include English language documents, web documents, books, magazines, emails and so forth. It should be noted that the keyphrase extraction system 100 is configured to extract key phrases present in documents across a variety of domains and requires no prior learning or training.

In one example, the document such as 108 includes a text document, that may be a single document or a set of combined documents. It should be noted that while many of the examples described herein are directed to processing of text documents, the techniques may be applied other types of documents.

The processor 104 includes a candidate phrase extractor 114, a word count determination module 116 and a key phrase selection module 118. Each component is described in further detail below. The candidate phrase extractor 114 is configured to access a document such as the document 108 and to identify a plurality of candidate phrases from the document 108 based upon a part-of-speech tag pattern. In one example, the candidate phrase extractor 114 employs a noun phrase extraction technique to identify the plurality of candidate phrases in the document 108. In this embodiment, each of the plurality of candidate phrases includes one or more candidate terms (e.g., words and/or phrases). Examples of the candidate phrase extractor 114 include Stanford extractor, Fast noun extractor and the like.

In some examples, the noun phrases identified by the candidate phrase extractor 114 are to be understood to include adjectives and other words and phrases that modify the noun.

The processor 104 further includes a pre-processing module 120 configured to preprocess the document 108 prior to identification of the plurality of candidate phrases. The pre-processing module 120 is configured to process the document 108 to remove noise elements such as related to bad encoding, operating system specific formatting, file conversion defects, and the like. The pre-processing module 120 is configured to perform certain operations such as fix newline, tabs and multiple spaces, replace double quotes with single quotes, delete punctuations, convert multiple full stops into single stops, and join back sentences separated by newlines in the document 108. The pre-processing module 120 is configured to improve the base quality of phrases in the pre-processed document 108. The pre-processed document 108 is then accessed by the candidate phrase extractor 114 to identify the plurality of candidate phrases.

In some examples, the candidate phrase extractor 114 is further configured to filter the plurality of candidate phrases based upon pre-determined filters to select a subset of the candidate phrases. For example, the candidate phrase extractor 114 is configured to remove phrases such as phrases that include one or more special characters, phrases that have terms listed in stop word list, phrases having single term with less than 3 alphanumeric characters, phrases having multiple words and having less than 5 characters, phrases having more than 4 terms, and so forth. Such pre-determined filters may be selected by a user of the system 100.

Further, the word count determination module 116 is configured to access an external knowledge base 122 to determine a vocabulary frequency count (e.g., word count) of the one or more candidate terms of each of the plurality of candidate phrases. As used herein, the terms "vocabulary frequency count" and "word count" of the candidate terms refer to a count of appearance of the respective candidate term in a plurality of documents accessible by the external knowledge base. The vocabulary frequency count of each of the candidate terms is indicative of rarity of the respective candidate term. In one example, the external knowledge base comprises Google books corpus available at the link- (https://research.googleblog.com/2006/08/all-our-n-gram-are-belong-to-you.html). The Google books corpus is an open dataset and provides a pure word counts that are generated from a large corpus of books and documents. However, other suitable knowledge base may be envisaged.

The key phrase selection module 118 is configured to estimate a phrase score for each of the plurality of candidate phrases based upon the vocabulary frequency count of the one or more candidate terms of each of the plurality of candidate phrases. Moreover, the key phrase selection module 118 is further configured to filter the plurality of candidate phrases based upon the phrase score and pre-determined thresholds to determine one or more key phrases (generally represented by reference numeral 124) present in the document 108.

In some examples, the key phrase selection module 118 is configured to estimate a term probability of each of the one or more candidate terms of the selected candidate phrases. Further, the key phrase selection module 118 is configured to estimate a word score for each of the candidate terms based upon the estimated term probabilities and estimate a phrase score of each of the selected candidate phrases based upon the word score. In some examples, the key phrase selection module 118 is further configured to estimate a key phrase importance score of the selected candidate phrases based upon the phrase score.

In one example, the key phrase selection module 118 is configured to estimate the term probability of the candidate terms of each of the candidate phrases in accordance with the relationship:

$$\text{term probability} = \frac{\text{vocabulary frequency count}}{\text{sum(all vocabulary frequency count)}} \quad (1)$$

where: vocabulary frequency count is word count of appearance of the respective candidate term in the phrase; and sum (all vocabulary frequency count) is sum of word counts of all the terms. Further, the key phrase selection module 118 is configured to estimate the word score of the candidate terms based upon a product of the term probabilities of all the candidate terms.

In this example, the key phrase selection module 118 is configured to estimate the phrase score of the candidate phrases in accordance with the relationship:

$$\text{phrase score} = (\text{word score}^{\wedge}(\log 1p(\text{vocabulary frequency count})))*(\text{word count}^{\wedge}5) \quad (2)$$

It should be noted that the phrase score of the candidate phrases is indicative of preference to words that are rare as compared to the English language. Moreover, probabilities of occurrence of two rare terms is multiplied to create even more rare phrase. Examples of such terms include grassroot innovation, driverless vehicle and so forth where occurrence of two or more rare terms form a rare phrase. In some examples, term frequencies of the candidate terms when penalized are used as power of the phrase probability.

Moreover, the key phrase selection module 118 is configured to determine a ranking of each of the candidate phrases based upon the estimated phrase score. In some examples, one or more key phrases present in the document are identified using the estimated phrase score and the ranking of each of the candidate phrases. Such identified key phrases 124 along with their respective phrase scores are displayed to the user via the output module 106. It should be noted that the above relationships for estimating the term probabilities and the phrase score are indicative of one way of estimating these parameters. Other computational relationships of estimating such parameters may be envisaged. In some examples, certain thresholds may be applied to the score or number of key phrases identified by the system 100. For example, a user may select top 10 or 20 key phrases among the key phrases identified by the system 100.

While FIG. 1 illustrates and the following provides a detailed description of various components/modules of the system 100, example embodiments are not limited thereto. For example, the above-identified modules of the system 100 may be implemented via one or more processors (e.g., the processor 104), where the one or more processor is configured to execute computer readable instructions stored on a memory (e.g., the memory 102) to carry out the functionalities of each of the above-identified modules.

Figure 2:
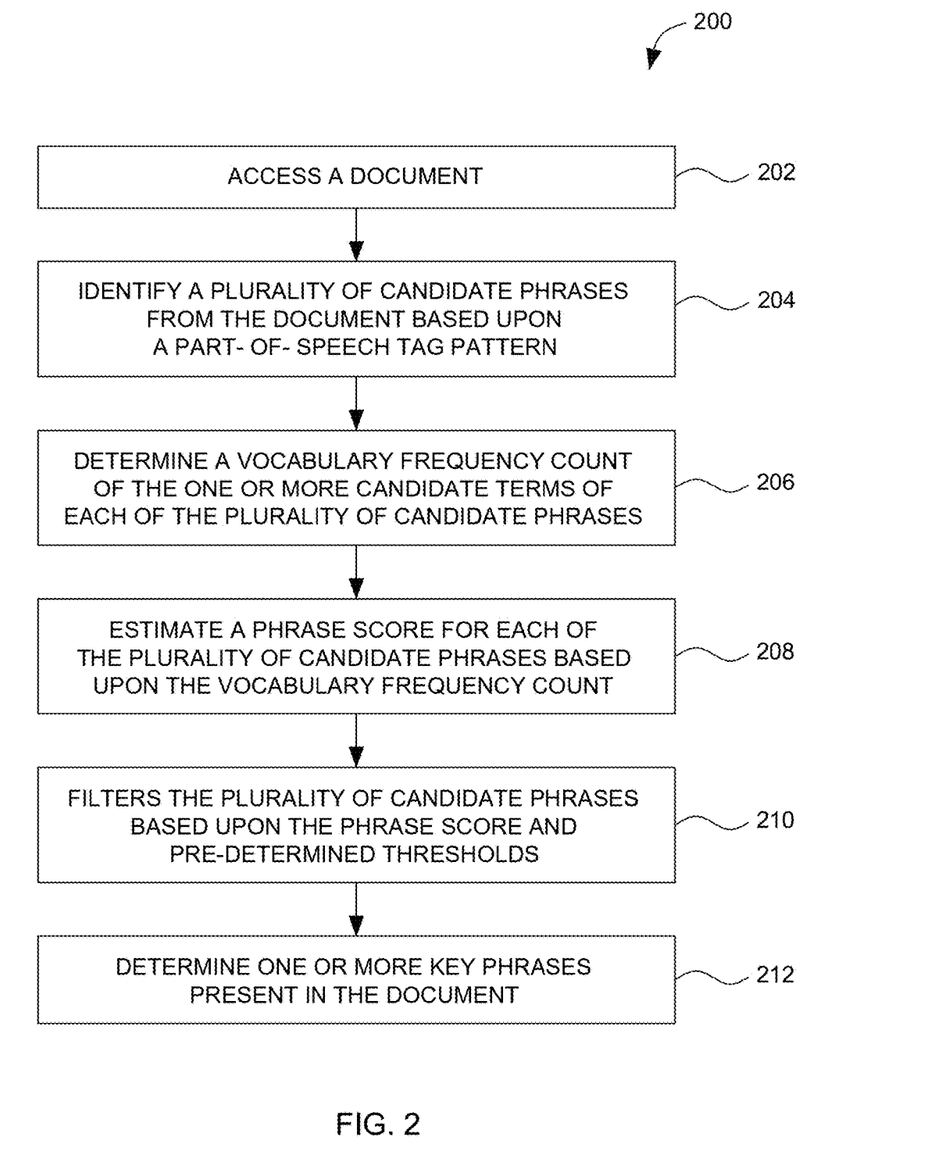
FIG. 2 is a flow chart illustrating a process for extracting key phrases present in a document using the keyphrase extraction system of FIG. 1, according to an example embodiment.

FIG. 2 is a flow chart illustrating a process 200 for extracting key phrases present in a document using the keyphrase extraction system 100 of FIG. 1, according to an example embodiment. FIG. 2 will be described from the perspective of a processor (e.g, the processor 104) that is configured to execute computer-readable instructions to carry out the functionalities of the above-described modules of the system 100 shown in FIG. 1.

At step 202, a document is accessed by the processor 104. The document may include English language documents, web documents, books, magazines, emails and so forth.

At step 204, the candidate phrase extractor 114 identifies a plurality of candidate phrases from the document based upon a part-of-speech tag pattern. In this example, the candidate phrase extractor 114 employs a noun phrase extractor to identify the plurality of candidate phrases. Each of the plurality of candidate phrases comprises one or more candidate terms.

At step 206, the word count determination module 116 determines a vocabulary frequency count of the one or more candidate terms of each of the plurality of candidate phrases using an external knowledge base. In one example, the word count determination module accesses Google books corpus to determine the vocabulary frequency count of the one or more candidate terms of the candidate phrases. The vocabulary frequency count of the candidate terms is indicative of rarity of the respective candidate term.

At step 208, the key phrase selection module 118 estimates a phrase score for each of the plurality of candidate phrases based upon the vocabulary frequency count of the one or more candidate terms of each of the plurality of candidate phrases. Moreover, at step 210, the key phrase selection module 118 filters the plurality of candidate phrases based upon the phrase score and pre-determined thresholds to determine one or more key phrases present in the document (step 212).

Figure 3:
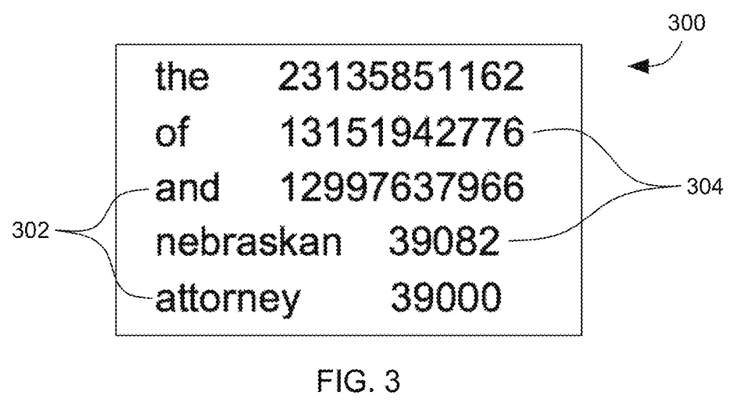
FIG. 3 is a table with examples of words appearing in Google books corpus along with their respective word counts.
Figure 4:
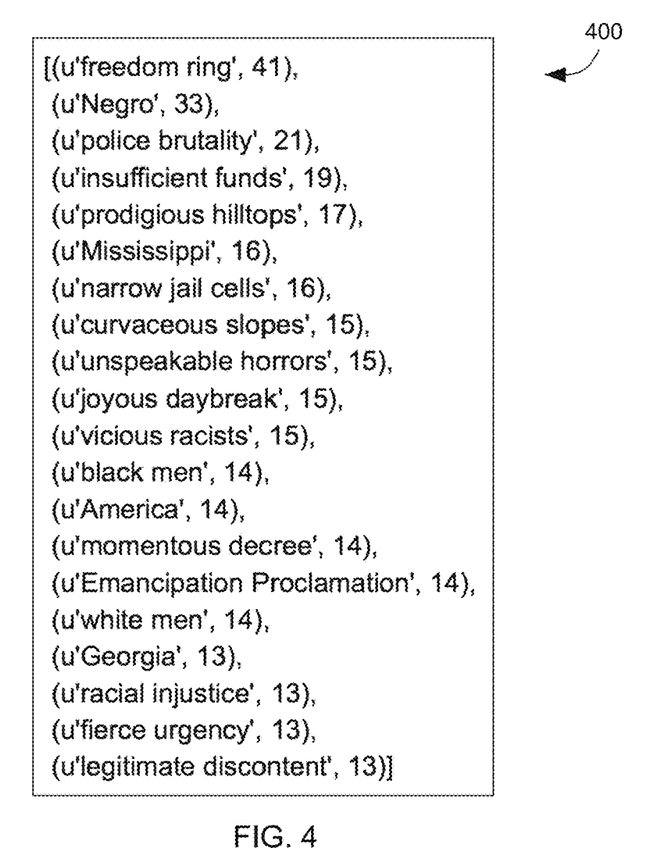
FIG. 4 illustrates example key phrases extracted from a document using the keyphrase extraction system of FIG. 1.

FIG. 3 is a table 300 illustrating example words appearing in Google books corpus along with their respective word counts. The set of words are represented by reference numeral 302 and their respective word counts are represented by reference numeral 304 as available in the Google books corpus. The word count 304 of each of the words is indicative of rarity of the word, or the candidate term. As can be seen, the word counts of the words such as "the", "of" are much higher than the word counts of words such as "Nebraskan" and "attorney" indicating that the words "Nebraskan" and "attorney" are relatively rare as compared to words "the", "of". Such words when present in the phrases are indicative of the phrases to be rare and thereby are determined as the key phrases present in a document, FIG. 4 illustrates example key phrases 400 extracted from a document using the keyphrase extraction system 100 of FIG. 1. In this example, the system 100 is used to extract key phrases from "I have a dream" speech available at https://www.archives.gov/files/press/exhibits/dream-speech.pdf.

As described before, the system 100 extracts the key phrases from the document using a combination of noun phrases extraction and word frequency count of the terms of the phrases using the Google book corpus. The key phrases 400 include top 20 key phrases present in the speech document along with the respective phrase scores. As can be seen, the system 100 identifies key phrases that are rare phrases such as "narrow jail cells", "joyous daybreak" and so forth along with their phrase scores using the noun phrase extractor based on a pre-defined noun pattern in combination with word count lookup in word count dictionary to identify uncommon words and uncommon phrases that are ranked.

Figure 5:
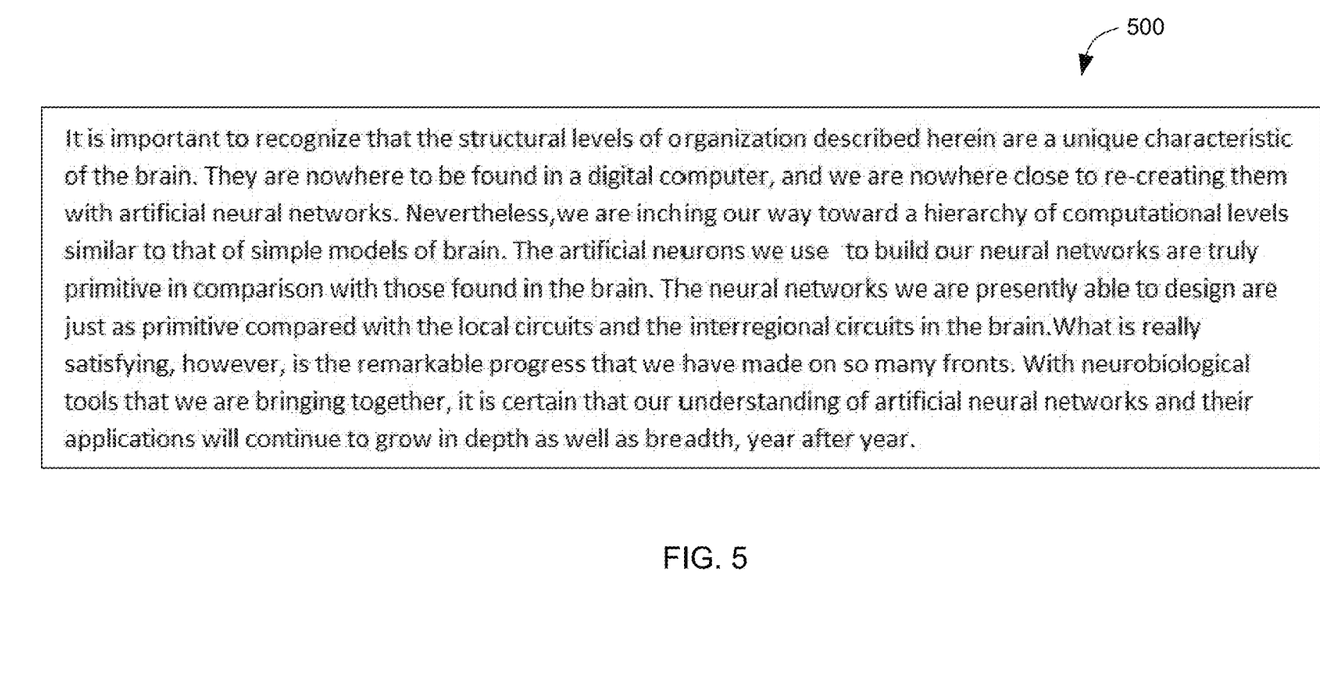
FIGS. 5-7 illustrate another example of key phrase extraction using the keyphrase extraction system of FIG. 1.
Figure 6:
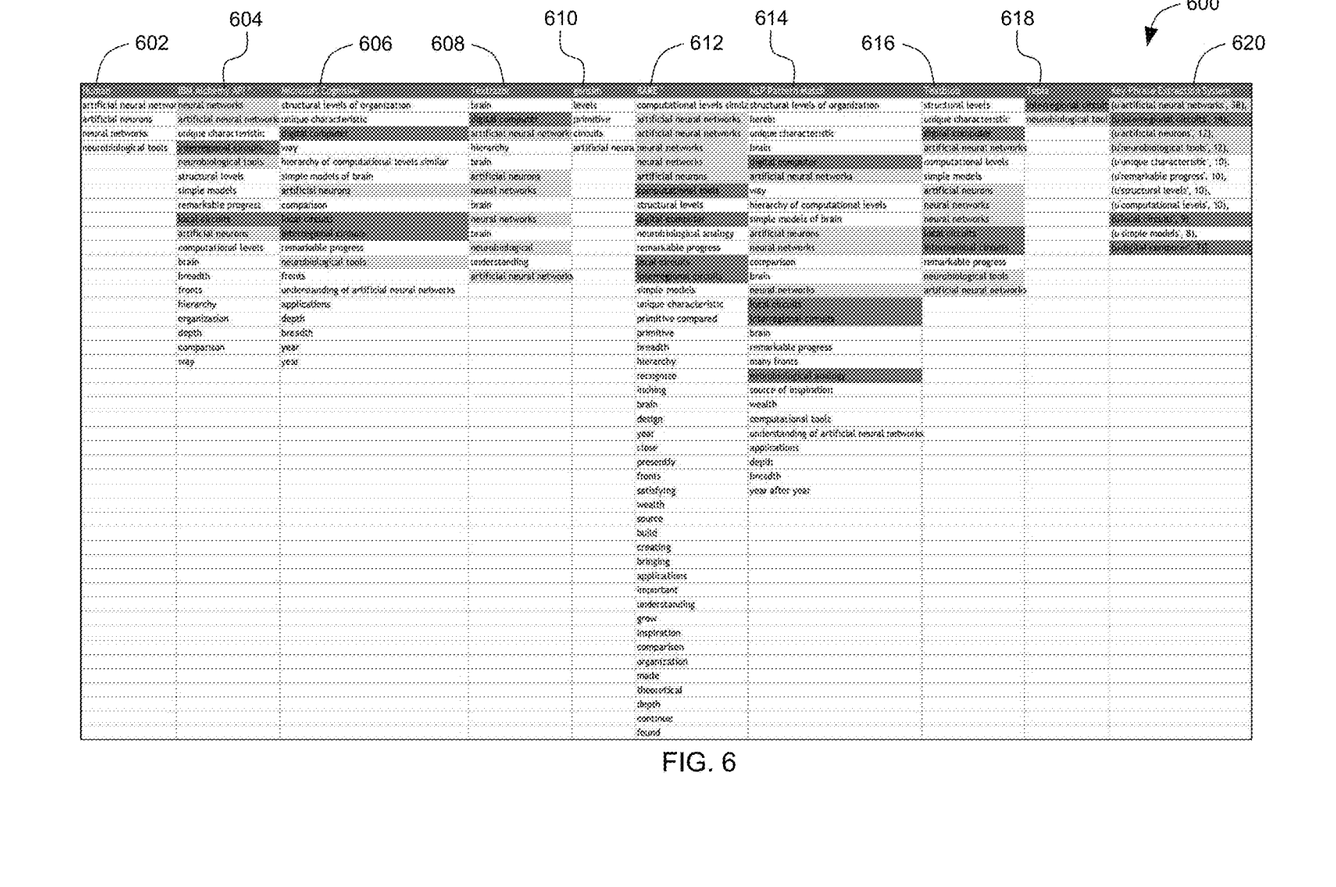
Figure 7:
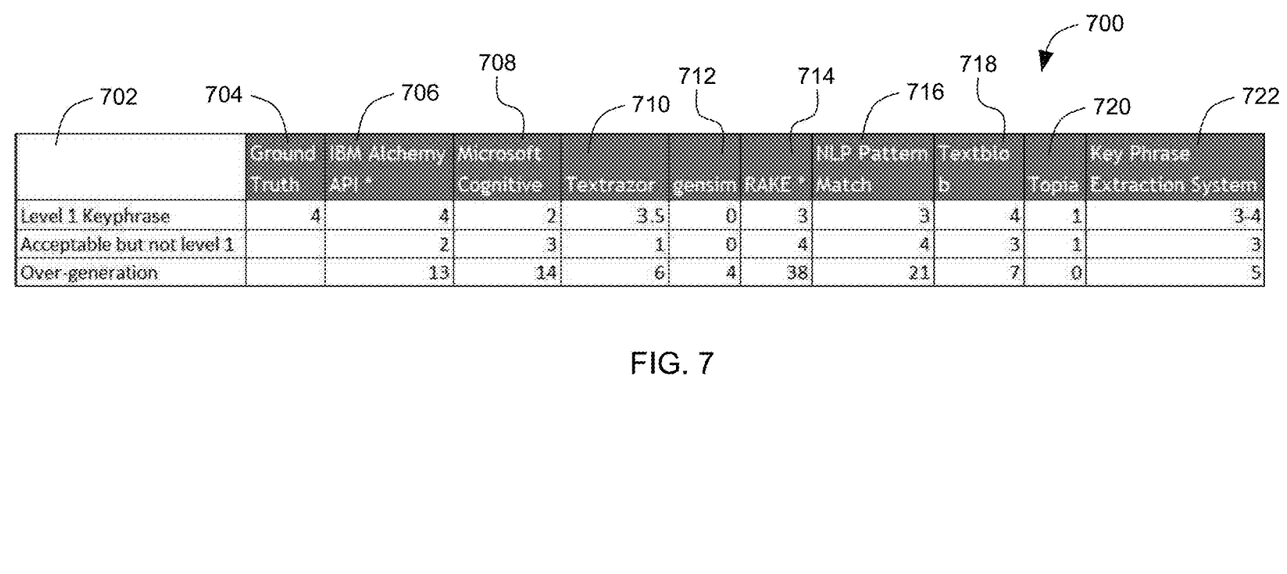

FIGS. 5-7 illustrate another example of key phrase extraction using the keyphrase extraction system 100 of FIG. 1. FIG. 5 illustrates sample text 500 used for extraction of key phrases by using existing key phrase extraction techniques and by the keyphrase extraction system 100 of FIG. 1. FIG. 6 illustrates key phrases 600 extracted using multiple existing tools and via the keyphrase extraction system 100 of FIG. 1. The first column (represented by reference numeral 602) illustrates key phrases manually identified by a user. Moreover, columns 604, 606, 608, 610, 612, 614, 616 and 618 illustrate key phrases extracted from the sample text 500 of FIG. 1 using tools such as IBM Alchemy API, Microsoft Cognitive, Textrazor, genism, Rake, NLP Pattern Match, Textblob, and Topia respectively. In addition, column 620 illustrates key phrases extracted from the sample text 500 of FIG. 1 using the keyphrase extraction system 100 of FIG. 1.

As can be seen, some of these tools such as IBM Alchemy API, Microsoft Cognitive, Rake and NLP Pattern Match extract relatively higher number of key phrases as compared to other tools such as genism, Textblob, and Topia. It should be noted that some of the key phrases extracted by these tools are not rare and may not be substantially relevant as compared to others. In this example, an optimal number of key phrases are extracted from the sample text 500 of FIG. 1 using the keyphrase extraction system 100. Such key phrases are extracted based on the word frequency count and are provided along with their respective phrase score, as indicated in column 620.

In this example, the key phrases such as "neural networks", "artificial neural networks", "artificial neurons" and "neurobiological tools" such as highlighted in light grey shade are representative of level 1 (most relevant) key phrases present in the document. Moreover, the key phrases such as "interregional circuits", "local circuits", "digital computer" and so forth such as highlighted in dark grey shade are representative of level 2 (acceptable) key phrases present in the document. Other key phrases such as "unique characteristic", "hierarchy of computational levels similar", and so forth are representative of over generation of key phrases that may not be substantially relevant. FIG. 7 illustrates comparison of number of such key phrases 700 extracted using multiple existing tools and via the keyphrase extraction system 100 of FIG. 1.

The first column (represented by reference numeral 702) illustrates number of key phrases manually identified by a user. Moreover, columns 704, 706, 708, 710, 712, 714, 716 and 718 illustrate number of key phrases in various categories extracted from the sample text 500 of FIG. 1 using tools such as IBM Alchemy API, Microsoft Cognitive, Textrazor, genism, Rake, NLP Pattern Match, Textblob, and Topia respectively. In addition, column 720 illustrates number of key phrases in various categories extracted from the sample text 500 of FIG. 1 using the keyphrase extraction system 100 of FIG. 1. As can be seen, tools like IBM Alchemy API, Microsoft Cognitive, Textrazor, Rake, and NLP Pattern Match extract many relevant level 1 key phrases along with extracting a substantially high number of key phrases that are not that relevant (over generation of phrases). Some other tools like genism and Topia have missed many relevant key phrases and have identified only a limited number of key phrases. In addition, the key phrases extracted from the sample text 500 using the system 100 are substantially relevant and includes both level 1 and acceptable key phrases without unnecessary over generation of key phrases.

The modules of the keyphrase extraction system 100 described herein are implemented in computing devices. One example of a computing device 800 is described below in FIG. 8. The computing device includes one or more processor 802, one or more computer-readable RAMs 804 and one or more computer-readable ROMs 806 on one or more buses 808. Further, computing device 800 includes a tangible storage device 810 that may be used to execute operating systems 820 and a keyphrase extraction system 100. The various modules of the keyphrase extraction system 100 including a memory 102, a processor 104 and, an output module 106, may be stored in tangible storage device 810. Both, the operating system 820 and the keyphrase extraction system 100 are executed by processor 802 via one or more respective RAMs 804 (which typically include cache memory). The execution of the operating system 820 and/or the keyphrase extraction system 100 by the processor 802 configures the processor 802 as a special purpose processor configured to carry out the functionalities of the functionalities of the operation system 820 and/or the keyphrase extraction system 100, as described above.

Figure 8:
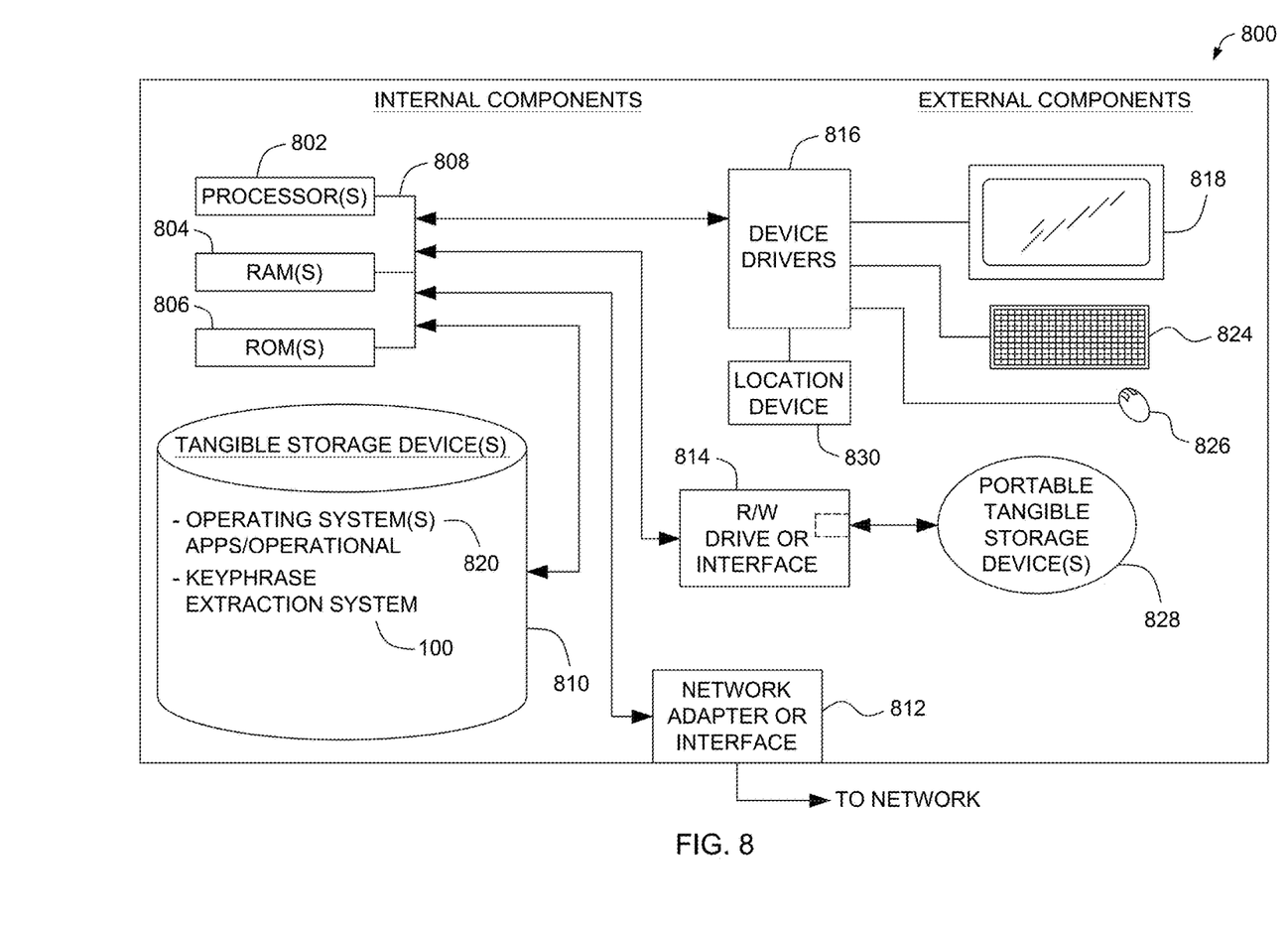
FIG. 8 is a block diagram of an embodiment of a computing device for implementing components of a keyphrase extraction system, according to an example embodiment.

Examples of storage devices 810 include semiconductor storage devices such as ROM 806, EPROM, flash memory or any other computer-readable tangible storage device that may store a computer program and digital information.

Computing device also includes a R/W drive or interface 814 to read from and write to one or more portable computer-readable tangible storage devices 828 such as a CD-ROM, DVD, memory stick or semiconductor storage device. Further, network adapters or interfaces 812 such as a TCP/IP adapter cards, wireless Wi-Fi interface cards, or 3G or 4G wireless interface cards or other wired or wireless communication links are also included in computing device.

In one example embodiment, the keyphrase extraction system 100 which includes a memory 102, a processor 104 and, an output module 106 may be stored in tangible storage device 810 and may be downloaded from an external computer via a network (for example, the Internet, a local area network or other, wide area network) and network adapter or interface 812.

Computing device further includes device drivers 816 to interface with input and output devices. The input and output devices may include a computer display monitor 818, a keyboard 824, a keypad, a touch screen, a computer mouse 826, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim, they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions, which have a configuration that is independent of the subject matters of the preceding dependent claims.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of inventive concepts, and all such modifications as would be obvious to one skilled in the art are intended to be included within the scope of the following claims.

The invention claimed is:

1. A keyphrase extraction system comprising:
a memory having computer-readable instructions stored therein; and
at least one processor configured to execute the computer-readable instructions to,
access an electronic document,
identify a plurality of candidate phrases from text of the electronic document based upon a part-of-speech tag pattern, each of the plurality of candidate phrases comprising one or more candidate terms,
access an external knowledge database to determine a vocabulary frequency count of the one or more candidate terms, the vocabulary frequency count of the one or more candidate terms corresponding to a count of appearance of the respective candidate term in a plurality of electronic documents accessible by the external knowledge database,
estimate a phrase score for each of the plurality of candidate phrases based on the vocabulary frequency count of the one or more candidate terms of each of the plurality of candidate phrases, the estimating the phrase score including estimating the phrase score of each of the candidate phrases in accordance with a relationship:

phrase score=(word score^(log 1$p$(vocabulary frequency count)))*(word count^5), filter the plurality of candidate phrases based upon the estimated phrase score and pre-determined thresholds, and
determine one or more key phrases present in the electronic document based upon the estimated phrase score of the filtered plurality of candidate phrases.

2. The system of claim 1, wherein the at least one processor is further configured to execute the computer-readable instructions to preprocess the electronic document to remove noise elements related to improper encoding of the electronic document, operating system specific formatting of the electronic document, file conversion defects included in the electronic document, or combinations thereof.

3. The system of claim 1, wherein the at least one processor is further configured to execute the computer-readable instructions to identify a plurality of candidate phrases from the electronic document using a noun phrase extraction technique.

4. The system of claim 1, wherein the at least one processor is further configured to execute the computer-readable instructions to:
filter the plurality of candidate phrases based upon pre-determined filters to select a subset of the candidate phrases; and
access the external knowledge database to determine a vocabulary frequency count of the one or more candidate terms of the selected subset of the candidate phrases.

5. The system of claim 4, wherein the at least one processor is further configured to execute the computer-readable instructions to:
remove from the plurality of candidate phrases the candidate phrases that comprise: special characters, terms from a stop word list, terms with less than 3 alphanumeric characters, terms with more than 4 terms, or combinations thereof.

6. The system of claim 4, wherein the at least one processor is further configured to execute the computer-readable instructions to:
access an online books corpus to determine the vocabulary frequency count of the one or more candidate terms of the selected subset of the candidate phrases, wherein the vocabulary frequency count of the candidate terms is indicative of rarity of the respective candidate term.

7. The system of claim 1, wherein the at least one processor is further configured to execute the computer-readable instructions to:
estimate a term probability of each of the one or more candidate terms of the filtered candidate phrases;
estimate a word score for each of the candidate terms of the filtered candidate phrases based upon the estimated term probabilities;
estimate a phrase score of each of the filtered candidate phrases based upon the word score; and
determine a ranking of the filtered candidate phrases based upon the estimated phrase score.

8. The system of claim 7, wherein the at least one processor is further configured to execute the computer-readable instructions to estimate the term probability of the candidate terms in accordance with a relationship:

$$\text{term probability} = \frac{\text{vocabulary frequency count}}{\text{sum(all vocabulary frequency count)}}$$

where: vocabulary frequency count is word count of appearance of the respective candidate term; and
sum (all vocabulary frequency count) is sum of word counts of all the terms.

9. The system of claim 8, wherein the at least one processor is further configured to execute the computer-readable instructions to estimate the word score of the candidate terms based upon a product of term probabilities of all the candidate terms.

10. The system of claim 1, wherein the at least one processor is further configured to execute the computer-readable instructions to determine a ranking of each of the candidate phrases based upon the estimated phrase score.

11. A method for extracting key phrases present in an electronic document, the method comprising:
identifying, using at least one processor, a plurality of candidate phrases from the electronic document based upon a part-of-speech tag pattern, wherein each of the plurality of candidate phrases comprises one or more candidate terms;
determining, using the at least one processor, a vocabulary frequency count of the one or more candidate terms of each of the plurality of candidate phrases using an external knowledge database;
estimating, using the at least one processor, a phrase score for each of the plurality of candidate phrases based on the vocabulary frequency count of the one or more candidate terms of the respective candidate phrases, the estimating the phrase score including estimating the phrase score of the candidate phrases in accordance with a relationship:

$$\text{phrase score} = (\text{word score}^\wedge(\log 1p(\text{vocabulary frequency count})))*(\text{word count}^\wedge 5); \text{ and}$$

determining, using the at least one processor, one or more key phrases present in the electronic document based on the estimated phrase score of each of the plurality of candidate phrases.

12. The method of claim 11, further comprising:
identifying, using the at least one processor, the plurality of candidate phrases from the electronic document based upon a noun phrase extraction technique.

13. The method of claim 11, further comprising:
preprocessing, using the at least one processor, the electronic document to remove noise elements to generate a pre-processed electronic document prior to identifying of the plurality of candidate phrases;
filtering, using the at least one processor, the plurality of candidate phrases to generate a subset of the candidate phrases; and
determining, using the at least one processor, the vocabulary frequency count of the one or more candidate terms of each of the subset of candidate phrases using the external knowledge database.

14. A keyphrase extraction system comprising:
a memory having computer-readable instructions stored therein; and
at least one processor configured to execute the computer-readable instructions to,
extract one or more key phrases present in an electronic document,
identify a plurality of candidate phrases from the electronic document using a noun phrase extraction technique, each of the plurality of candidate phrases comprising one or more candidate terms,
access an external knowledge database to determine a word count of the one or more candidate terms, the word count of the one or more candidate terms corresponding to a count of appearance of the respective candidate term in a plurality of electronic documents accessible by the external knowledge database,
estimate a phrase score for each of the plurality of candidate phrases based upon the word count of the one or more candidate terms of each of the plurality of candidate phrases, the estimating the phrase score including estimating the phrase score of the candidate phrases in accordance with a relationship:

$$\text{phrase score} = (\text{word score}^\wedge(\log 1p(\text{vocabulary frequency count})))*(\text{word count}^\wedge 5), \text{ and}$$

determine one or more key phrases based upon the estimated phrase score.

15. The system of claim 14, wherein the at least one processor is further configured to execute the computer-readable instructions to:
estimate a term probability of each of the candidate terms of the identified candidate phrases;
estimate a word score for each of the candidate terms based upon the estimated term probabilities; and
estimate the phrase score of each of selected candidate phrases based upon the word score.

16. The system of claim 14, wherein the at least one processor is further configured to execute the computer-readable instructions to access an online books corpus to determine the word count of the one or more candidate terms.

17. The system of claim 14, wherein the at least one processor is further configured to execute the computer-readable instructions to apply threshold filters to select the one or more key phrases present in the electronic document.

18. The system of claim 14, wherein the at least one processor is further configured to execute the computer-readable instructions to identify key phrases present in electronic documents across a plurality of domains.

19. The system of claim 14, wherein the at least one processor is further configured to execute the computer-readable instructions to rank the identified candidate phrases based upon the estimated phrase score of each of the identified candidate phrases.

* * * * *